US012681732B2

(12) United States Patent
Mcavoy et al.

(10) Patent No.: US 12,681,732 B2
(45) Date of Patent: Jul. 14, 2026

(54) DETERMINATION OF A LINEAR RELATIONSHIP BASED ON PRODUCER-CONSUMER PAIRS

(71) Applicant: Arm Limited, Cambridge (GB)

(72) Inventors: William James Mcavoy, Raleigh, NC (US); Brian Michael Stempel, Raleigh, NC (US); Alexander Cole Shulyak, Austin, TX (US); Devin S. Lafford, Austin, TX (US); Scott Courtland Hadley, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/817,723

(22) Filed: Aug. 28, 2024

(65) Prior Publication Data

US 2026/0064422 A1 Mar. 5, 2026

(51) Int. Cl.
*G06F 9/38* (2018.01)

(52) U.S. Cl.
CPC ............ *G06F 9/383* (2013.01); *G06F 9/3824* (2013.01); *G06F 9/3832* (2013.01); *G06F 9/3838* (2013.01); *G06F 9/3842* (2013.01)

(58) Field of Classification Search
CPC .... G06F 9/3832; G06F 9/3842; G06F 9/3838; G06F 9/3824; G06F 9/3826; G06F 9/383
See application file for complete search history.

(56) References Cited

U.S. PATENT DOCUMENTS

| | | | |
|---|---|---|---|
| 5,761,474 A | 6/1998 | Lesartre et al. | |
| 7,234,044 B1 | 6/2007 | Perry | |
| 7,725,513 B2 | 5/2010 | Zabarski | |
| 9,973,187 B1 * | 5/2018 | Pant | H03K 17/223 |
| 11,327,763 B2 * | 5/2022 | Perais | G06F 9/3806 |
| 11,442,863 B2 | 9/2022 | Shulyak et al. | |
| 12,045,170 B2 | 7/2024 | Shulyak et al. | |
| 2003/0217249 A1 * | 11/2003 | Postiff | G06F 9/384 |
| | | | 712/E9.05 |
| 2010/0306509 A1 | 12/2010 | Day | |
| 2012/0278596 A1 | 11/2012 | Tran | |

(Continued)

OTHER PUBLICATIONS

Office Action dated Aug. 11, 2025 for U.S. Appl. No. 18/817,355, 18 pages.

(Continued)

*Primary Examiner* — Jyoti Mehta
*Assistant Examiner* — Emilio Alcantara-Ramos
(74) *Attorney, Agent, or Firm* — NIXON & VANDERHYE P.C.

(57) ABSTRACT

A producer-consumer relationship is stored. The producer-consumer relationship defines an association between a producer instruction and at least one consumer instruction, wherein a consumer value of the at least one consumer instruction is generated in dependence on producer data resulting from the producer instruction. A first producer-consumer pair and a second producer-consumer pair are selected from a plurality of observed instructions and a linear relationship between consumer values and producer data values is determined based on: respective consumer values of the first producer-consumer pair and the second producer-consumer pair and respective producer data values of the first producer-consumer pair and the second producer-consumer pair.

20 Claims, 11 Drawing Sheets

(56)           References Cited

U.S. PATENT DOCUMENTS

| | | |
|---|---|---|
| 2013/0318330 A1* | 11/2013 | Alexander ........ G06F 9/30043 |
| | | 712/225 |
| 2014/0281402 A1 | 9/2014 | Comparan |
| 2015/0089190 A1 | 3/2015 | Gonion |
| 2015/0089191 A1 | 3/2015 | Gonion |
| 2016/0378480 A1 | 12/2016 | Matveyev |
| 2017/0091104 A1 | 3/2017 | Rafacz |
| 2019/0087521 A1 | 3/2019 | Haskins, Jr. |
| 2020/0409712 A1* | 12/2020 | Clancy ................. G06F 9/3858 |
| 2021/0089312 A1* | 3/2021 | Kothinti Naresh ... G06F 9/3867 |
| 2021/0096861 A1* | 4/2021 | Wang ................. G06F 9/30047 |
| 2021/0124585 A1 | 4/2021 | Grubisic |
| 2021/0389951 A1 | 12/2021 | Perais et al. |
| 2022/0237478 A1 | 7/2022 | Lafford |
| 2022/0391214 A1 | 12/2022 | Eyole et al. |
| 2023/0176973 A1 | 6/2023 | Shulyak |
| 2023/0229596 A1 | 7/2023 | Shulyak |
| 2023/0315446 A1 | 10/2023 | Oshiyama |

OTHER PUBLICATIONS

U.S. Appl. No. 18/817,355, filed Aug. 28, 2024, Shul Yak et al.
Search Report for GB Application No. 2511342.4 dated Dec. 18, 2025, 5 pages.
Search Report for GB Application No. 2510859.8 dated Dec. 15, 2025, 5 pages.

\* cited by examiner $$slope = \frac{\Delta(Value\ CONS\text{-}2 - Value\ CONS\text{-}1)}{\Delta(Data_{PROD\text{-}2} - Data_{PROD\text{-}1})}$$

$$offset = Value\ CONS\text{-}1 - (slope * Data_{PROD\text{-}1})$$

Figure 5:
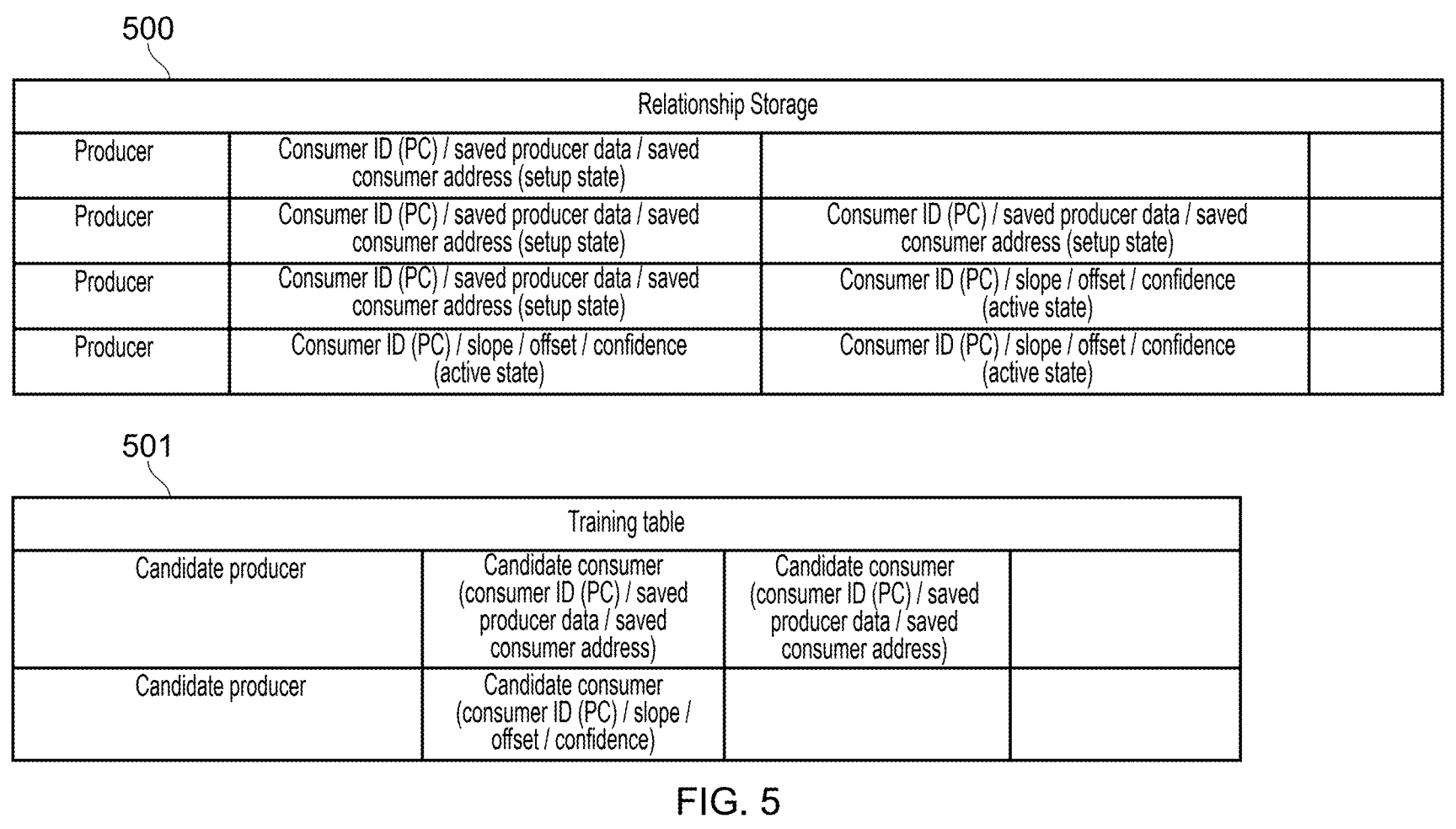

| Relationship Storage | |
|---|---|
| Producer | Consumer ID (PC) / saved producer data / saved consumer address (setup state) |
| Producer | Consumer ID (PC) / saved producer data / saved consumer address (setup state) |
| Producer | Consumer ID (PC) / saved producer data / saved consumer address (setup state) |
| Producer | Consumer ID (PC) / slope / offset / confidence (active state) |

500

| Training table | |
|---|---|
| Candidate producer | Candidate consumer (consumer ID (PC) / saved producer data / saved consumer address) |
| Candidate producer | Candidate consumer (consumer ID (PC) / slope / offset / confidence) |

800 — Select producer instruction

801 — Select first producer-consumer pair

802 — Select second producer-consumer pair

803 — Determine linear relationship between consumer values and producer data values using respective consumer values and respective producer data values

DETERMINATION OF A LINEAR RELATIONSHIP BASED ON PRODUCER-CONSUMER PAIRS

TECHNICAL FIELD

The present disclosure relates to data processing.

DESCRIPTION

A data processing apparatus may perform data processing operations by executing instructions. Amongst the many instructions that the data processing apparatus executes there may be a producer-consumer relationship between a producer instruction and a consumer instruction, whereby a consumer instruction source value is generated in dependence on producer data resulting from the producer instruction.

SUMMARY

In one example embodiment described herein there is apparatus comprising:

relationship storage circuitry to store a producer-consumer relationship, the producer-consumer relationship defining an association between a producer instruction and at least one consumer instruction, wherein a consumer value of the at least one consumer instruction is generated in dependence on producer data resulting from the producer instruction; and relationship determination circuitry to select a first producer-consumer pair and a second producer-consumer pair from a plurality of observed instructions, and to determine a linear relationship between consumer values and producer data values based on:

respective consumer values of the first producer-consumer pair and the second producer-consumer pair and respective producer data values of the first producer-consumer pair and the second producer-consumer pair.

In one example embodiment described herein there is a system comprising:

the apparatus of any example embodiment, implemented in at least one packaged chip;

at least one system component; and a board, wherein the at least one packaged chip and the at least one system component are assembled on the board.

In one example embodiment described herein there is a chip-containing product comprising the system of any example embodiment assembled on a further board with at least one other product component.

In one example embodiment described herein there is a method of data processing comprising:

storing a producer-consumer relationship, the producer-consumer relationship defining an association between a producer instruction and at least one consumer instruction, wherein a consumer value of the at least one consumer instruction is generated in dependence on producer data resulting from the producer instruction;

selecting a first producer-consumer pair and a second producer-consumer pair from a plurality of observed instructions; and determining a linear relationship between consumer values and producer data values based on:

respective consumer values of the first producer-consumer pair and the second producer-consumer pair and respective producer data values of the first producer-consumer pair and the second producer-consumer pair.

In one example embodiment described herein there is a non-transitory computer-readable medium to store computer-readable code for fabrication of an apparatus comprising:

relationship storage circuitry to store a producer-consumer relationship, the producer-consumer relationship defining an association between a producer instruction and at least one consumer instruction, wherein a consumer value of the at least one consumer instruction is generated in dependence on producer data resulting from the producer instruction; and relationship determination circuitry to select a first producer-consumer pair and a second producer-consumer pair from a plurality of observed instructions, and to determine a linear relationship between consumer values and producer data values based on:

respective consumer values of the first producer-consumer pair and the second producer-consumer pair and respective producer data values of the first producer-consumer pair and the second producer-consumer pair.

BRIEF DESCRIPTION OF THE DRAWINGS

The present invention will be described further, by way of example only, with reference to embodiments thereof as illustrated in the accompanying drawings, in which:

FIG. 5 schematically illustrates relationship storage and a training table in accordance with some examples;

DESCRIPTION OF EXAMPLE EMBODIMENTS

Figure 1:
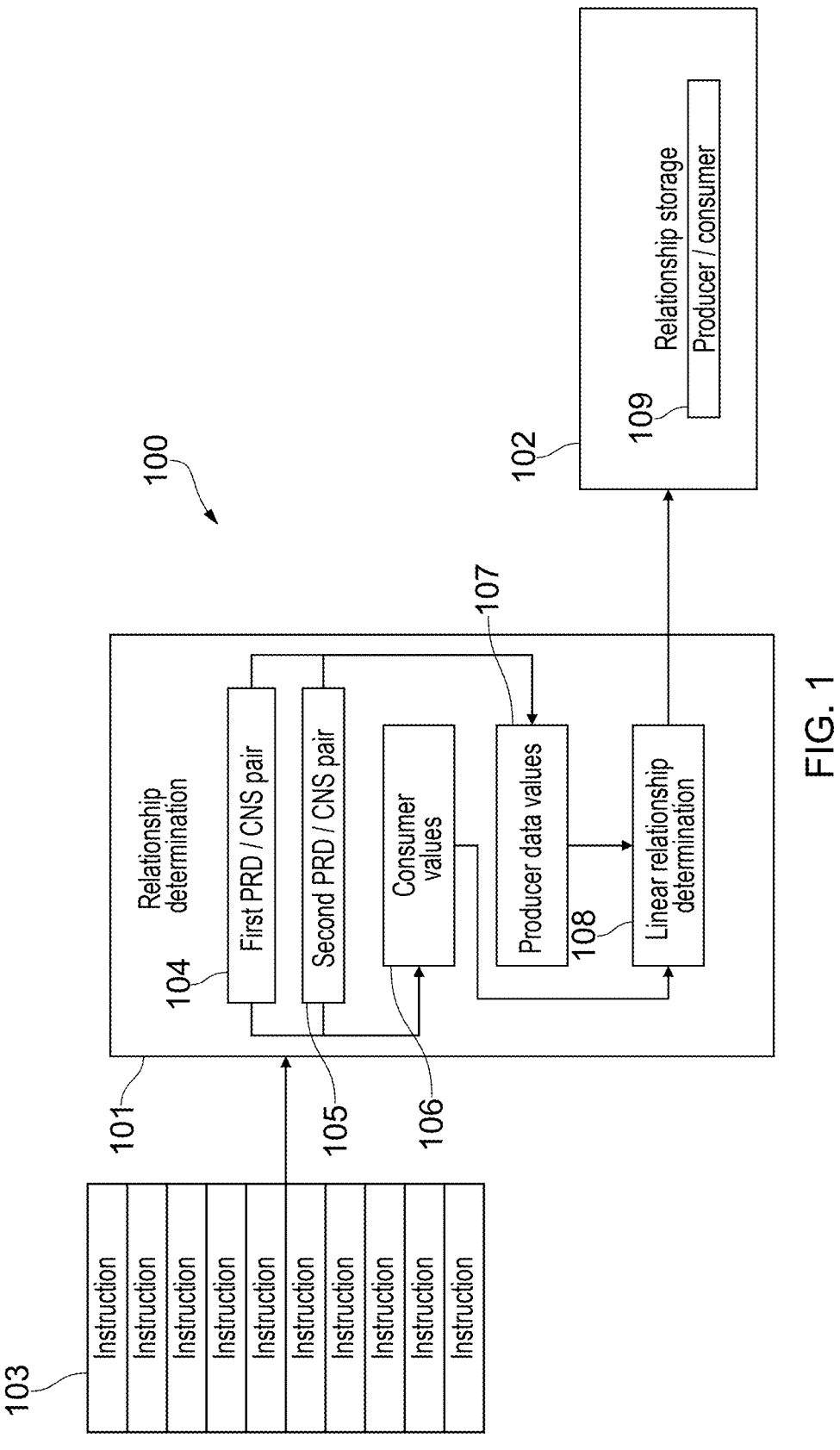
FIG. 1 schematically illustrates an apparatus in accordance with some examples.

Before discussing the embodiments with reference to the accompanying figures, the following description of embodiments is provided.

In accordance with example configurations herein there is apparatus comprising:

relationship storage circuitry to store a producer-consumer relationship, the producer-consumer relationship defining an association between a producer instruction and at least one consumer instruction, wherein a consumer value of the at least one consumer instruction is generated in dependence on producer data resulting from the producer instruction; and relationship determination circuitry to select a first producer-consumer pair and a second producer-consumer pair from a plurality of observed instructions, and to determine a linear relationship between consumer values and producer data values based on:

respective consumer values of the first producer-consumer pair and the second producer-consumer pair and respective producer data values of the first producer-consumer pair and the second producer-consumer pair.

In an apparatus that encounters instructions, such as a data processing apparatus which is configured to perform data processing operations by executing instructions, there may be various dependencies between instructions. For example, there may be a producer-consumer relationship between a producer instruction and a consumer instruction, whereby a consumer instruction value (e.g. a source operand or other data value generated and used in the course of execution of the consumer instruction) is generated in dependence on producer data resulting from the producer instruction. It may be useful to identify this relationship for a number of reasons, often related to improving the data processing efficiency of the data processing apparatus. Where the consumer instruction value depends on producer data resulting from the producer instruction, it will be understood that execution of that consumer instruction cannot begin until that producer data is available. However the computational chain from the producer data to the consumer value may have an arbitrary number of steps, making an analysis of those computational steps too complex task in many contexts to be implementable. However, the inventors of the present techniques have realised that, regardless of the actual steps taken to derive a consumer value from a producer data value, there are circumstances when there is a linear relationship between consumer values and producer data values. Identifying such a linear relationship is useful, since for example the linear relationship can then be used to predict a consumer instruction value using an item of producer data. Relationship determination circuitry is provided to select producer-consumer pairs from a plurality of observed instructions and to determine the linear relationship by analysis of the respective consumer values and producer data values of those producer-consumer pairs.

The particular manner in which the relationship determination circuitry determines the linear relationship between the consumer values and the producer data values may take various forms, but in some examples the relationship determination circuitry is configured to determine the linear relationship between the consumer values and the producer data values by determining:

a consumer value difference between the respective consumer values of the first producer-consumer pair and the second producer-consumer pair;

a producer data difference between the respective producer data values of the first producer-consumer pair and the second producer-consumer pair;

a slope value given by a ratio of the consumer value difference to the producer data difference;

a scaled producer value given by a producer data value of one of: the first producer-consumer pair and the second producer-consumer pair, multiplied by the slope value; and an offset value given by a difference between a consumer value of: one of the first producer-consumer pair and the second producer-consumer pair, and the scaled producer value.

An identified linear relationship may be used or stored in various ways, but in some examples, a representation of the linear relationship is stored in the relationship storage circuitry as the producer-consumer relationship.

A linear relationship may be variously represented, but in some examples the slope value and the offset value are stored in the relationship storage circuitry as the representation of the linear relationship.

Producer-consumer pairs from which a linear relationship may be determined may be identified and selected in various ways, but in some examples the relationship determination circuitry is configured to select the first producer-consumer pair from a first plurality of observed instructions in a first sampling period relating to the producer instruction and to select the second producer-consumer pair from a second plurality of observed instructions in a second sampling period relating to the producer instruction. Accordingly, the producer instruction and the consumer instruction remain the same (for example as identified by their respective program counter (PC) values), and two distinct instances of the use of that producer instruction, each with distinct data values, and two distinct instances of the use of that consumer instruction, each with distinct consumer values can then be respectively paired, and the linear relationship derived from those two pairs, in analogous manner to the determination of a linear relationship between variables x and y, from a first and a second (x, y) pair.

In some examples the relationship storage circuitry is configured to store the first producer-consumer pair from the first sampling period in place of the producer-consumer relationship, and following the second sampling period and the determination of the linear relationship based on the first producer-consumer pair and the second producer-consumer pair from the second sampling period, to store the linear relationship as the producer-consumer relationship.

When a producer-consumer linear relationship is identified, it can be made use of in order to improve data processing efficiency, for example by allowing consumer values to be predicted on the basis of producer data. This may for example allow execution of the consumer instruction to be speculatively commenced earlier. However the cost of such a prediction being wrong may be such that it is preferable to establish a degree of confidence in the linear relationship before it is used. Accordingly, in some examples, the apparatus further comprises: training circuitry to select a candidate producer from a plurality of observed instructions in a sampling period to evaluate a candidate producer-consumer relationship between the candidate producer instruction and subsequent candidate consumer instructions in the plurality of observed instructions and, when the candidate producer instruction and a subsequent candidate consumer instruction meet the linear relationship, to increase a confidence value associated with the candidate producer-consumer relationship.

In some examples, the training circuitry is configured to select the subsequent candidate consumer instructions in the plurality of observed instructions by using the linear relationship applied to the producer data resulting from the candidate producer instruction to predict consumer values of the subsequent candidate consumer instructions. For example the training circuitry may be configured such that, once a linear relationship is known, all subsequent load addresses are compared to a predicted load address. If any match, then a confidence can be increased. A further filter can be applied if the consumer entry tracks the load's PC, and then the confidence is only increased if the PC matches.

The producer instruction and the consumer instruction may be various types of instruction, but the present techniques may be of particular use in the context of load instructions, because of the latency associated with the performance of a load. That is, when a consumer value of a consumer load instruction (e.g. the load address) is dependent on data resulting from a producer load instruction (i.e. based on the data value returned by the producer load), the consumer load cannot usually be performed until that producer data has been retrieved and subject to whatever intervening processing is used to generate the load address of the consumer load instruction. However, the linear relationship enables consumer load addressed to be predicted from producer data values, enabling the consumer loads to be initiated (e.g. as a prefetch) sooner. Accordingly in some examples, the producer instruction is a producer load and the at least one consumer instruction is at least one consumer load, wherein a load address of the at least one consumer load is generated in dependence on the producer data retrieved by the producer load.

In some examples the apparatus further comprises:
a cache to store local copies of data items for use in data processing operations; and
prefetch circuitry to initiate a prefetch of data for storage in the cache,
wherein the prefetch circuitry is configured to initiate the prefetch for the at least one consumer load by using the linear relationship to predict the load address of the at least one consumer load.

Various types of prefetching may be implemented and in some examples the prefetch circuitry is configured to use the at least one consumer load as a further producer load from which at least one further consumer load is generated in dependence on further producer data retrieved by the further producer load. In some examples the prefetch circuitry is configured to perform strided prefetching.

In some circumstances it may be expected that there is some quantization to the values that represent the linear relationship may take. Accordingly in some examples, the relationship determination circuitry is responsive to generation of a non-zero remainder when determining the ratio of the consumer value difference to the producer data difference to determine that the linear relationship represented by the slope value and the offset value is not valid.

The producer data may take a variety of forms, but in some examples, the producer data comprises an array index. This represents a context in which the present techniques may be of benefit, for example where the array is a set of addresses used (directly or indirectly) to provide consumer load addresses, whereby prediction of a consumer load address on the basis of producer data (the array index) can allow the consumer load to be initiated sooner (for example as part of a prefetch mechanism).

In some examples the producer data comprises a pointer indicative of the consumer value of the at least one consumer instruction. The use of a pointer also adds indirection to the link between the producer data and the consumer value, meaning that establishing the linear relationship in this context may also be beneficial, for example where the consumer value provides a consumer load address, such that the consumer load can be initiated sooner. Viewed from the perspective of using an array and an array index, a pointer can be treated as an index with element size 1 and base address 0.

In some examples the training circuitry is configured to select a candidate consumer instruction in dependence on a difference limit between the producer data and the consumer value, and an indication of the producer instruction and the candidate consumer instruction is selectively stored in the relationship storage circuitry in place of the producer-consumer relationship.

In some examples the processing circuitry comprises a 6×128 bit vector datapath.

In accordance with example configurations herein there is a system comprising:
the apparatus of any of the above-discussed examples, implemented in at least one packaged chip;
at least one system component; and
a board, wherein the at least one packaged chip and the at least one system component are assembled on the board.

In accordance with example configurations herein there is a chip-containing product comprising the above-mentioned system assembled on a further board with at least one other product component.

In accordance with example configurations herein there is a method of data processing comprising:
storing a producer-consumer relationship, the producer-consumer relationship defining an association between a producer instruction and at least one consumer instruction, wherein a consumer value of the at least one consumer instruction is generated in dependence on producer data resulting from the producer instruction;
selecting a first producer-consumer pair and a second producer-consumer pair from a plurality of observed instructions; and
determining a linear relationship between consumer values and producer data values based on:
respective consumer values of the first producer-consumer pair and the second producer-consumer pair and
respective producer data values of the first producer-consumer pair and the second producer-consumer pair.

In accordance with example configurations herein there is a non-transitory computer-readable medium to store computer-readable code for fabrication of an apparatus comprising:
relationship storage circuitry to store a producer-consumer relationship, the producer-consumer relationship defining an association between a producer instruction and at least one consumer instruction, wherein a consumer value of the at least one consumer instruction is generated in dependence on producer data resulting from the producer instruction; and
relationship determination circuitry to select a first producer-consumer pair and a second producer-consumer pair from a plurality of observed instructions, and to determine a linear relationship between consumer values and producer data values based on:
respective consumer values of the first producer-consumer pair and the second producer-consumer pair and respective producer data values of the first producer-consumer pair and the second producer-consumer pair.

Particular embodiments will now be described with reference to the figures.

FIG. 1 illustrates apparatus 100 in accordance with one embodiment. The apparatus comprises relationship determination circuitry 101 and relationship storage circuitry 102. The apparatus is arranged to monitor a sequence of instructions 103 and from those instructions to select a first producer-consumer pair 104 and a second producer-consumer pair 105. From these the relationship determination circuitry 101 extracts respective consumer values 106 from the first producer-consumer pair 104 and the second producer-consumer pair 105 and extracts respective producer data values 107 from the of the first producer-consumer pair 104 and the second producer-consumer pair 105. Using these, the relationship determination circuitry 101 determines a linear relationship 108 between consumer values and producer data values. The relationship storage circuitry 102 stores a producer-consumer relationship 109, which may be represented by the linear relationship.

Figure 2:
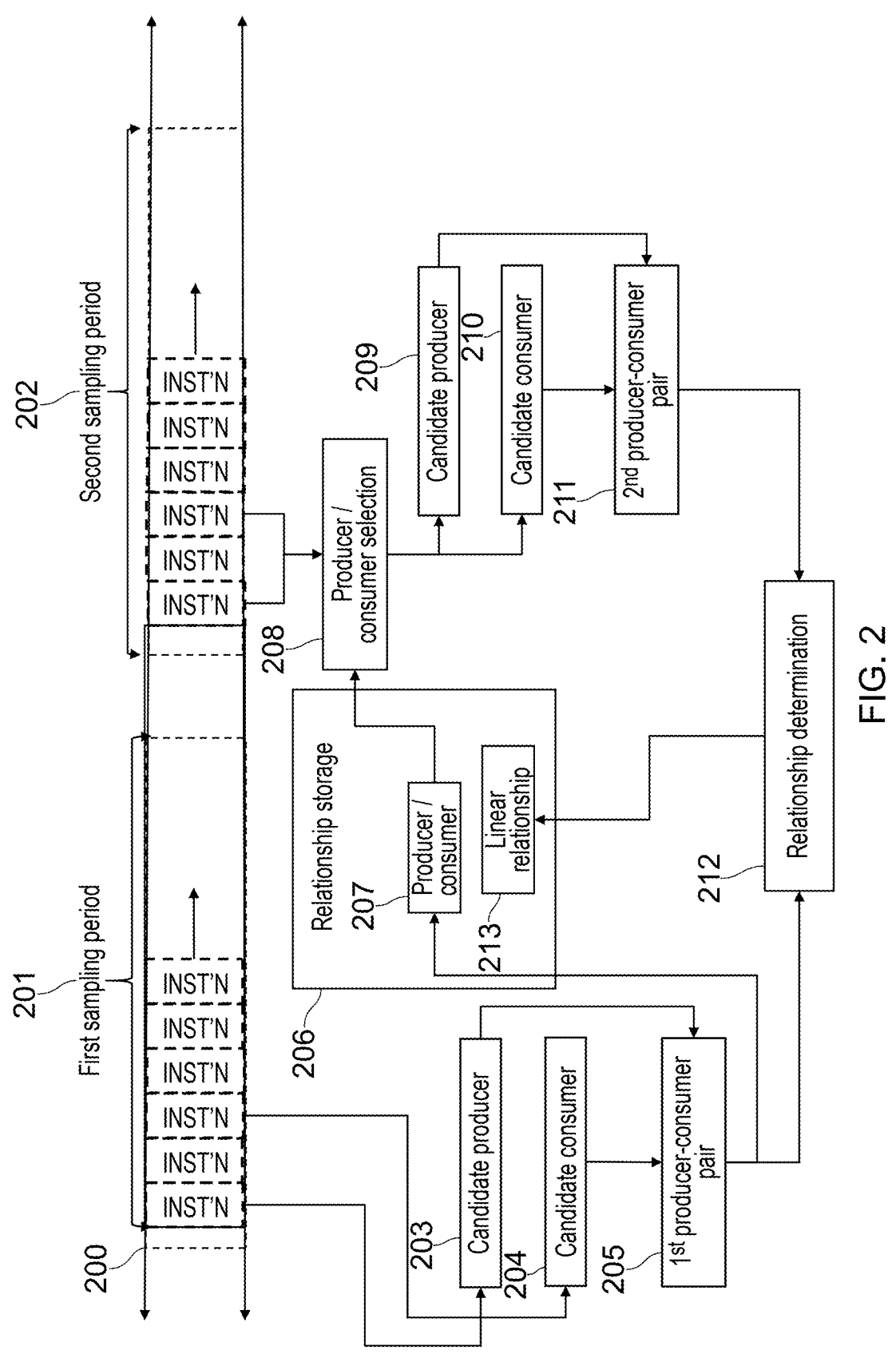
FIG. 2 schematically illustrates relationship determination in accordance with some examples.

FIG. 2 schematically illustrates relationship determination in accordance with some examples. A sequence of instructions 200 is monitored in a first sampling period 201 and subsequently in a second sampling period 202. For the first sampling period, a candidate producer 203 is selected and a candidate consumer 204 is selected. These thus form a first producer-consumer pair 205, in particular providing a first producer data value and a first consumer value. This producer-consumer pair 205 is stored in the relationship storage 206 as a producer-consumer relationship 207. Then, the sequence of instructions is monitored in a second sampling period 202. The producer-consumer relationship 207 (providing an indication of the respective program counter values of the producer and consumer) steers the candidate producer/consumer selection 208, such that two new respective instances of the producer and consumer are selected to give candidate producer 209 is selected and candidate consumer 210. These thus form a second producer-consumer pair 211, in particular providing a second producer data value and a second consumer value. The first producer data value and first consumer value (provided by the first producer-consumer pair 205) and the second producer data value and second consumer value (provided by the second producer-consumer pair 211) are then processed by the relationship determination circuitry 212 to determine a linear relationship between producer data value and consumer values and the result 213 is stored in the relationship storage 206.

Figure 3:
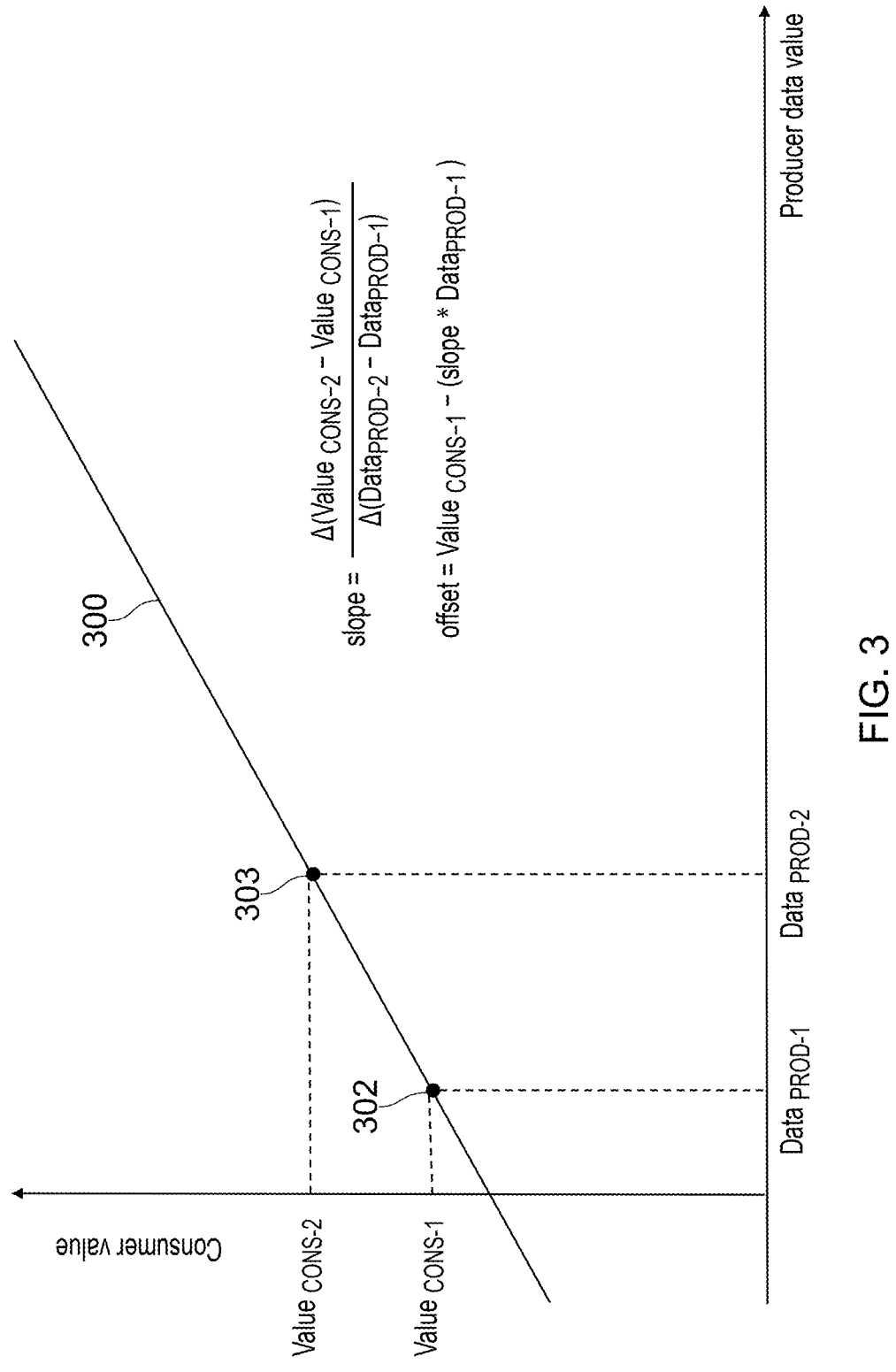
FIG. 3 schematically illustrates the determination of a linear relationship between producer data values and consumer values in accordance with some examples.

FIG. 3 schematically illustrates the determination of a linear relationship between producer data values and consumer values in accordance with some examples. A linear relationship 300 between producer data values and consumer values is shown. This linear relationship is identified by the selection of two producer-consumer pairs 302, 303. The producer data values may, for example, be array indices and the consumer values may, for example, be load addresses for a consumer load instruction. The linear relationship between the consumer values and the producer data values can be determined in two parts: a slope value and an offset value. The slope value can be determined by means of a difference between the respective consumer values of the first producer-consumer pair and the second producer-consumer pair. This is divided by a difference between the respective producer data values of the first producer-consumer pair and the second producer-consumer pair to give the slope value. The offset can then be determined by multiplying the producer data value of one of the first producer-consumer pair and the second producer-consumer pair and subtracting this from the consumer value of the corresponding one of the first producer-consumer pair and the second producer-consumer pair. Formulaically expressed, as shown in the figure:

$$slope = \frac{\Delta(Value_{CONS-2} - Value_{CONS-1})}{\Delta(Data_{PROD-2} - Data_{PROD-1})}$$

$$offset = Value_{CONS-1} - (slope * Data_{PROD-1})$$

Figure 4:
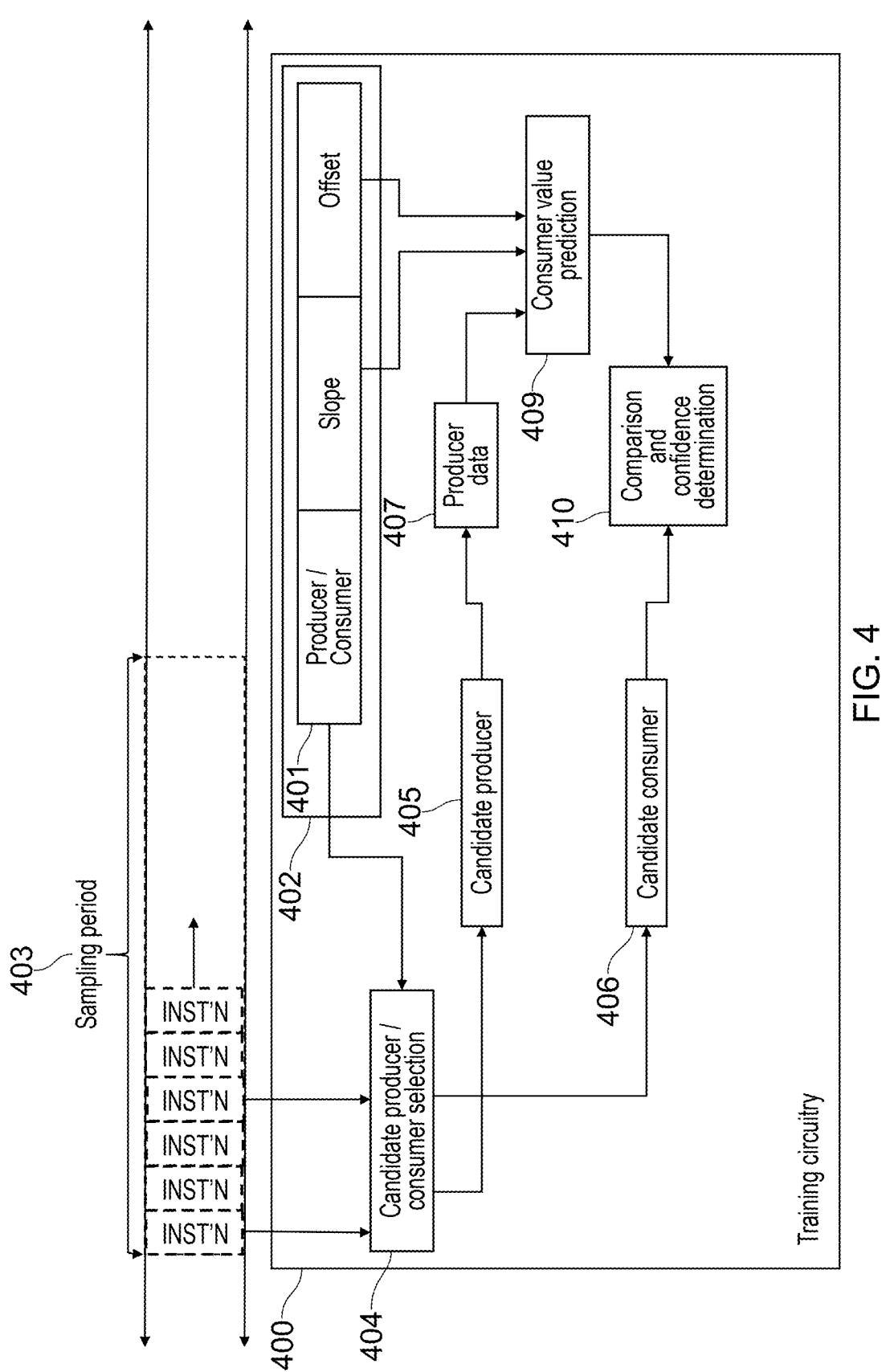
FIG. 4 schematically illustrates training circuitry in accordance with some examples.

FIG. 4 schematically illustrates training circuitry 400 in accordance with some examples. A sampled producer forms the basis of this instruction sampling period 403 and, where this sampled producer matches an entry 401 in the relationship storage, this entry is imported to the training circuitry and held in a training table 402. This entry then controls the training that is carried out with respect to the instruction sampling period 403. The producer forms the basis of this instruction sampling period 403 and the matching entry 401 steers the candidate consumer selection 404 such that observed instances of these instructions are selected. A candidate producer 405 is first selected, followed by a candidate consumer 406. The sampled producer dictates the identification of the candidate producer 405 and the producer data value 407 resulting from the candidate producer 405 is used, in combination with the linear relationship provided by the entry 401 (here in the form of a slope and offset value), to predict a consumer value 409. The consumer selection 404 preferentially selects consumers that are indicated by the entry 401 and the predicted consumer value and the actual consumer value taken from the candidate consumer 406 are then compared by comparison and confidence circuitry 410. When the two coincide, a confidence associated with the entry can be increased.

FIG. 5 schematically illustrates relationship storage 500 and a training table 501 in accordance with some examples. The relationship storage 500 is arranged to store producer-consumer relationships, which as can be seen in the figure are generally in the form of an entry comprising a producer identifier and one or more consumer identifiers. The consumer identifier (PC) may be stored in association with an instance of saved producer data and a saved consumer address or may be stored in association with a slope value and an offset value. Furthermore, a confidence value may be stored in association with a consumer identifier. The consumer information may either be in a setup state (in which the producer-consumer relationship is in the process of being established) or in an active state (in which a producer-consumer relationship has already been established and is being used in further training to develop its confidence). A single producer may have multiple consumers in different states. Example use of the training table may be as discussed above with reference to FIG. 4. The example table 501 in the figure shows two training table entries. The first comprises an indication of a candidate producer and indications of one or more candidate consumers. The second comprises an indication of a candidate producer and an indication of a candidate consumer, together with a slope value and an offset value. The first entry thus corresponds to a first training phase in which candidate consumers are selected, seeking to establish a relationship with a candidate producer. The second entry corresponds to a second training phase in which a candidate producer/consumer pair and an associated candidate linear relationship (slope/offset) are tested against observed instructions in a sampling period to determine/update a confidence associated with that linear relationship.

Figure 6:
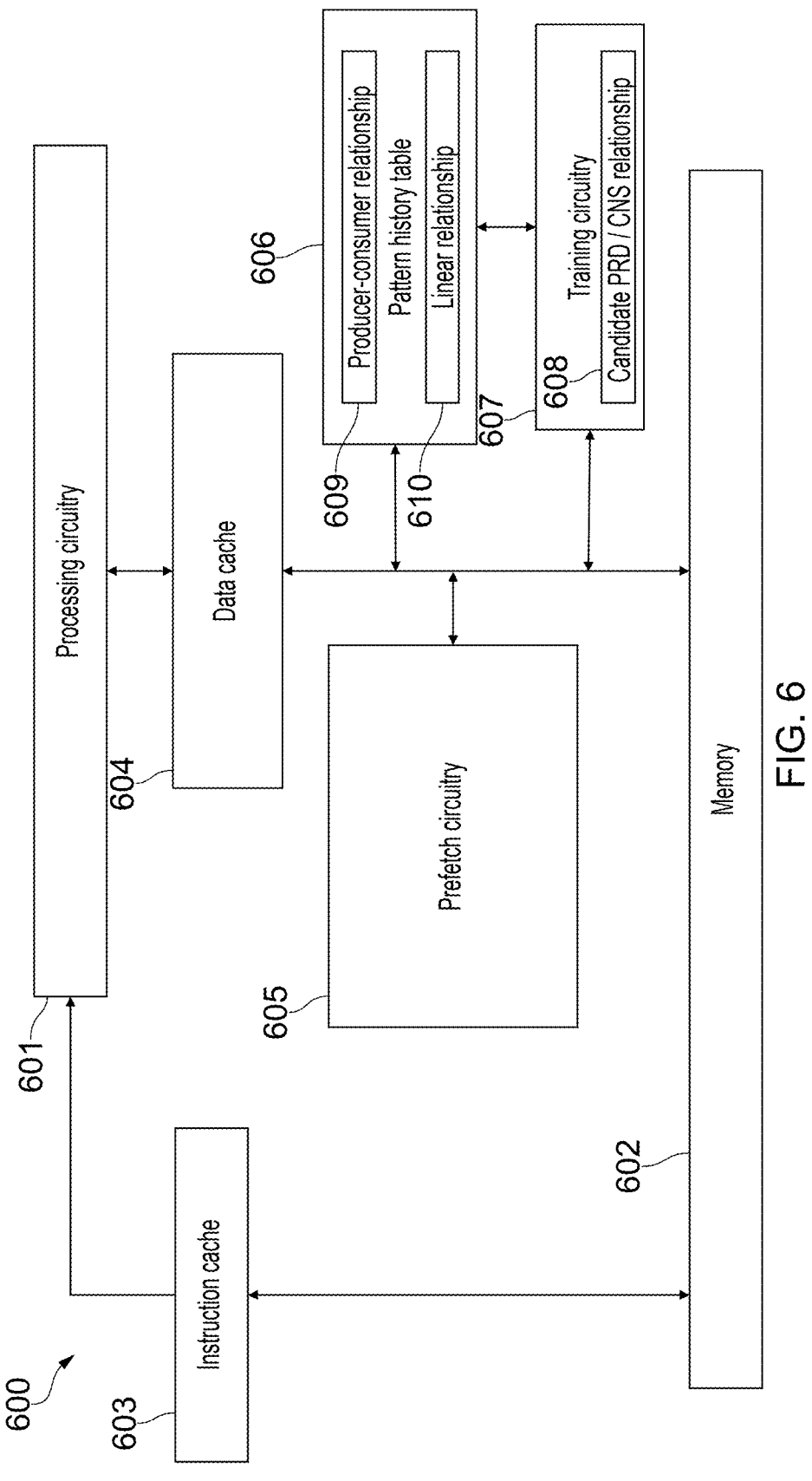
FIG. 6 schematically illustrates an apparatus in accordance with some examples.

FIG. 6 schematically illustrates an apparatus 600 in accordance with some examples. The apparatus comprises processing circuitry 601, which is arranged to perform data processing operations defined by a sequence of instructions. These instructions are stored in memory 602 and may be temporarily cached in instruction cache 603. Data values that are the subject of the data processing operations are loaded from and stored to the memory 602. These data values may be temporarily cached in data cache 604. In performing the data processing operations, various producer-consumer relationships may be encountered. One such type of producer-consumer relationship of relevance to FIG. 6 arises when the producer instruction is a producer load instruction and the consumer instruction is a consumer load instruction, whereby a load address of the consumer load instruction is generated in dependence on a producer data value retrieved by the producer load instruction. The apparatus further comprises prefetch circuitry 605, which is arranged to initiate prefetches for load instructions that are expected to be encountered in the upcoming sequence of instructions. Data values retrieved by such prefetch operations are stored in the data cache 604, so that when those expected load instructions are indeed encountered the corresponding data values are already available in the data cache, avoiding the latency associated with the performance of the loads. The prefetch circuitry 605 may be configured to identify the prefetches to be performed in any known manner, such as through the use of a stride prefetcher that is arranged to identify regular patterns of loads (such as a sequence of loads from memory addresses with a constant (or at least easily calculable) offset between the memory addresses). Prefetched consumer loads may occur in a number of ways. In some cases, one or more consumer prefetches may be triggered directly from an executed producer load. In other cases, another prefetcher (such as a stride prefetcher) may initiate the prefetch of the producer and subsequently the data from that producer prefetch is used to generate a consumer prefetch. In yet other cases there may be a recursive producer load, which is both a consumer load and a producer load.

The apparatus 600 further comprises training circuitry 607, which is arranged to establish candidate producer-consumer relationships. For this purpose, the training circuitry 607 may be configured to operate in accordance with the example described above with reference to FIGS. 2 and 4. Hence, a candidate producer-consumer relationship 608 may form the subject of training with respect to a sampling period. This may comprise either the initial establishment of the relationship or a subsequent reinforcement of the relationship when a confidence associated with the relationship is modified. The pattern history table 606 provides relationship storage, in particular holding one or more producer-consumer relationships 609, as well as storing one or more derived linear relationships 610. The linear relationship(s) 610 can also be provided to the prefetch circuitry 605, on the basis of which prefetched may be initiated, e.g. following an identified producer load instruction, a resulting data value from that producer load can be used to generate a consumer prefetch, having predicted a consumer value of the consumer using the linear relationship.

Figure 7:
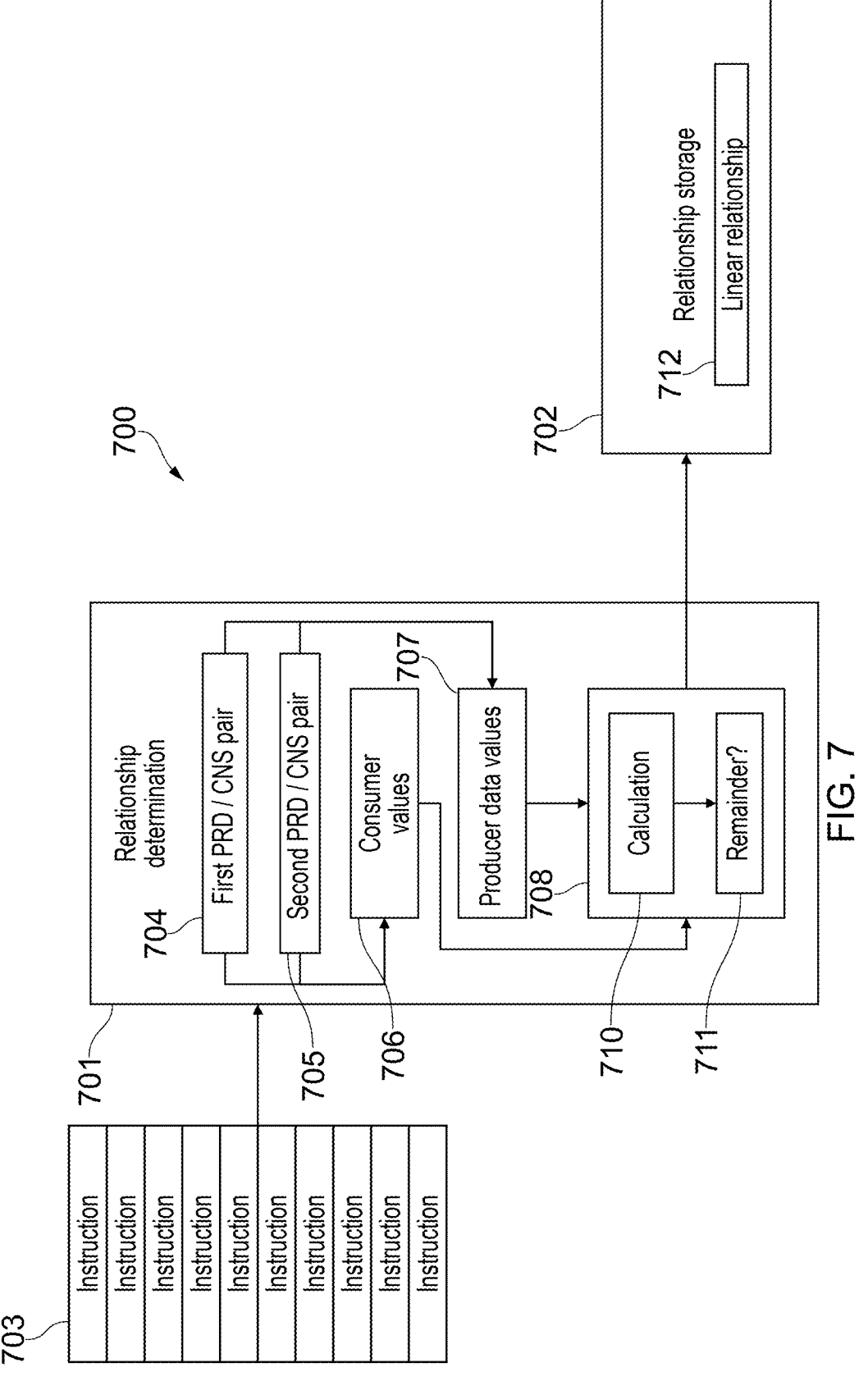
FIG. 7 schematically illustrates an apparatus in accordance with some examples.

FIG. 7 schematically illustrates an apparatus 700 in accordance with some examples. The apparatus 700 is a variant of the apparatus 100 shown in FIG. 1. As such the relationship determination circuitry 701, relationship storage circuitry 702, and sequence of instructions 703 operate essentially as described with reference to 101, 102, and 103 in FIG. 1. The variant here differs in the determination of the linear relationship by linear relationship determination circuitry 708. Here, the calculation circuitry 710 is configured to determine the linear relationship on the basis of the consumer values 706 and the producer data values 707, for example as described above with reference to FIG. 3. An additional feature of this example is the remainder checking circuitry 711, which checks whether a non-zero remainder has resulted when determining the ratio of the consumer value difference to the producer data difference. When such a non-zero remainder occurs the linear relationship determination circuitry 708 treats the linear relationship represented by the slope value and the offset value as not valid (e.g. does not cause the linear relationship 712 to be stored in the relationship storage 702.

Figure 8:
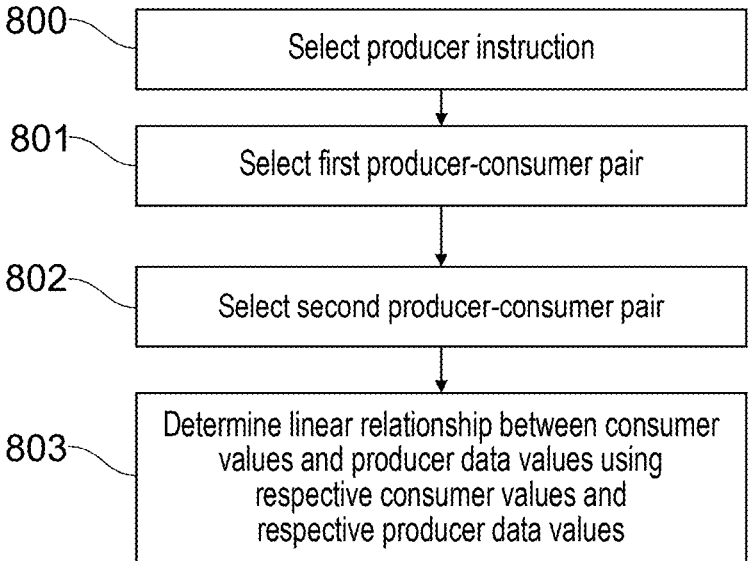
FIG. 8 is a flow diagram schematically illustrating a sequence of steps that are taken in a method in accordance with some examples.

FIG. 8 is a flow diagram schematically illustrating a sequence of steps that are taken in a method in accordance with some examples. Initially at step 800, a producer instruction is selected. Then, at step 801, a first producer-consumer pair is selected. The producer of the first producer-consumer pair is a first instance of the producer instruction and the consumer of the first producer-consumer pair is a candidate consumer (which is being tested to determine whether it supports a linear relationship with the producer). At step 802, a second producer-consumer pair is selected. The producer of the second producer-consumer pair is a second instance of the same producer instruction and the consumer of the second producer-consumer pair is a second instance of the consumer instruction that provided the candidate consumer for the first producer-consumer pair. Finally, at step 803, it is determined whether there is a linear relationship between the consumer values and producer data values using respective consumer values and respective producer data values from the first producer-consumer pair and the second producer-consumer pair.

Figure 9:
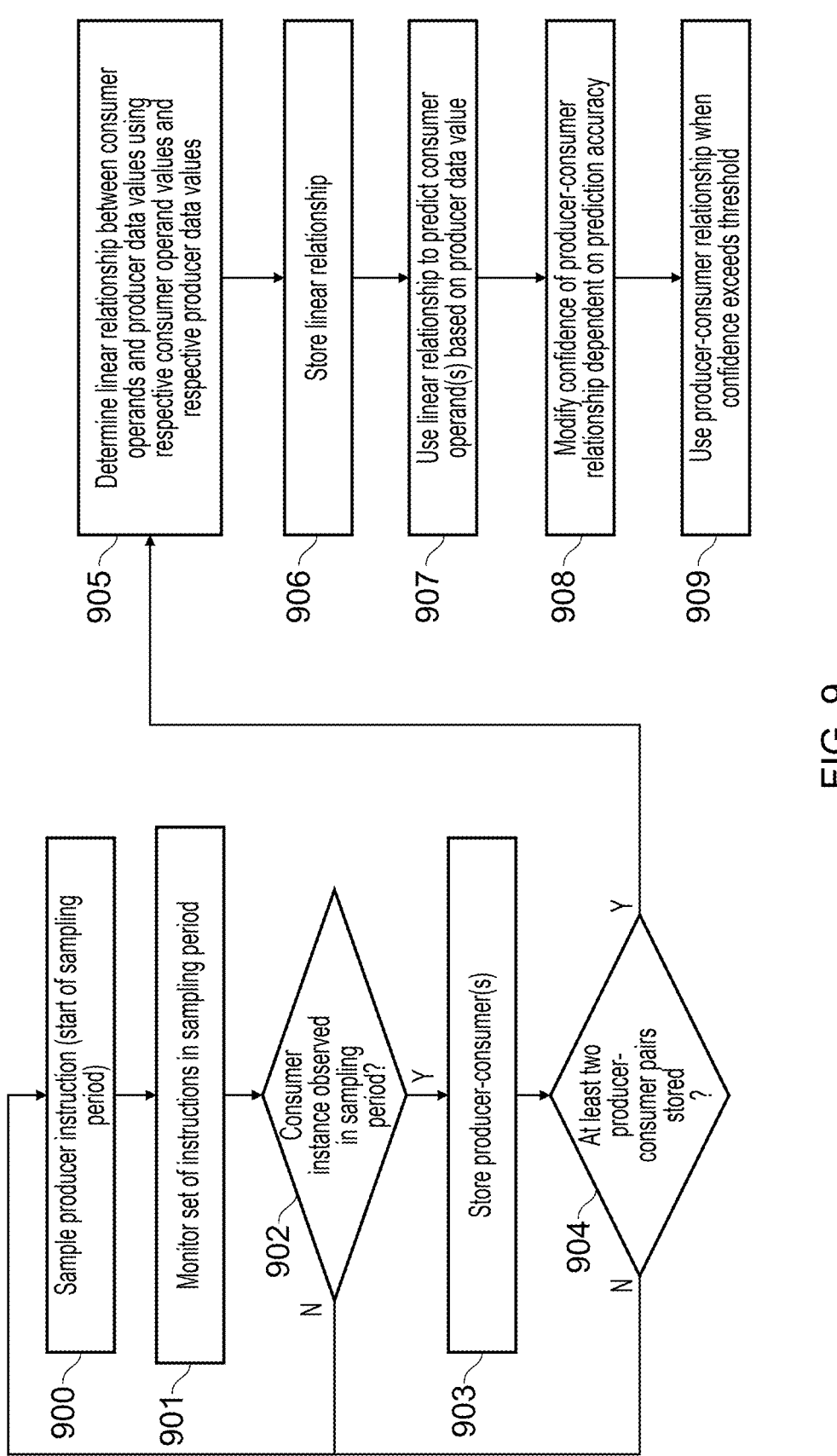
FIG. 9 is a flow diagram schematically illustrating a sequence of steps that are taken in a method in accordance with some examples.

FIG. 9 is a flow diagram schematically illustrating a sequence of steps that are taken in a method in accordance with some examples. At step 900 a sampled producer instruction (e.g. as identified by a particular program counter (PC) value) forms the first instruction of a new sampling period. Then at step 901 monitoring of a set of instructions in this sampling period begins. In the event that, during this monitoring/first sampling period no suitable consumer instances are observed then, at step 902, the flow returns to step 900 and a new producer instance is selected. However when consumer instances are observed, at step 903, a producer-consumer pair is stored in the relationship storage. Until at least two producer-consumer pairs have been stored in the relationship storage, the flow loops back to step 900 for further sampling to continue. Once at least two producer-consumer pairs have been stored, the flow can proceed to step 905, where a linear relationship is determined between the consumer values and the producer data values using respective consumer values and respective producer data values. The linear relationship is stored at step 906. Next, at step 907 the stored linear relationship is used to predict consumer value(s) based on a producer data value of a later instance of the producer instruction. These predicted consumer value(s) are then compared against actual consumer values for corresponding later instances of the consumer instruction. Based on the comparison at step 908 a confidence associated with the linear relationship is modified and at step 909, when the confidence associated with the linear relationship exceeds a threshold, the linear relationship is used (for example to trigger consumer prefetches).

Figure 10:
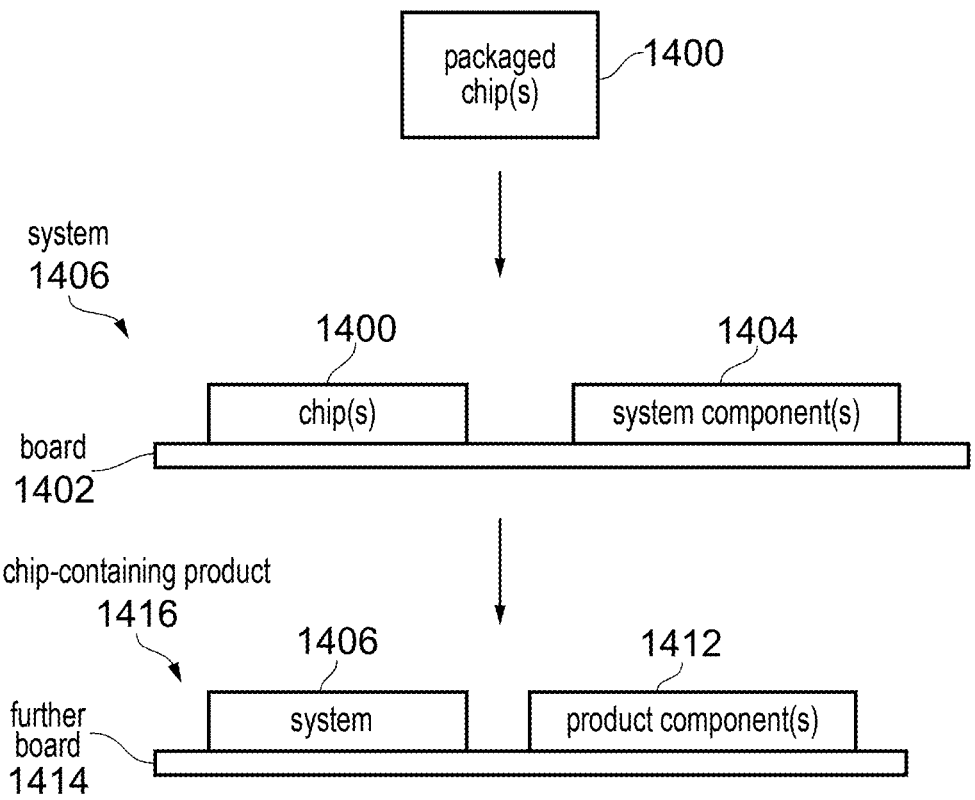
FIG. 10 schematically illustrates a system comprising an implementation in a packaged chip and an implementation in a chip-containing product in accordance with some examples.

Concepts described herein may be embodied in a system comprising at least one packaged chip. The apparatus and circuitry described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade). FIG. 10 schematically illustrates a system 1406 comprising an implementation in a packaged chip 1400 and an implementation in a chip-containing product 1416 in accordance with some examples. Hence, one or more packaged chips 1400, with the apparatus described above implemented on one chip or distributed over two or more of the chips, are manufactured by a semiconductor chip manufacturer. In some examples, the chip product 1400 made by the semiconductor chip manufacturer may be provided as a semiconductor package which comprises a protective casing (e.g. made of metal, plastic, glass or ceramic) containing the semiconductor devices implementing the apparatus and circuitry described above and connectors, such as lands, balls or pins, for connecting the semiconductor devices to an external environment. Where more than one chip 1400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 1400 are assembled on a board 1402 together with at least one system component 1404 to provide a system 1406. For example, the board may comprise a printed circuit board. The board substrate may be made of any of a variety of materials, e.g. plastic, glass, ceramic, or a flexible substrate material such as paper, plastic or textile material. The at least one system component 1404 comprise one or more external components which are not part of the one or more packaged chip(s) 1400. For example, the at least one system component 1404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 1416 is manufactured comprising the system 1406 (including the board 1402, the one or more chips 1400 and the at least one system component 1404) and one or more product components 1412. The product components 1412 comprise one or more further components which are not part of the system 1406. As a non-exhaustive list of examples, the one or more product components 1412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 1406 and one or more product components 1412 may be assembled on to a further board 1414.

The board 1402 or the further board 1414 may be provided on or within a device housing or other structural support (e.g. a frame or blade) to provide a product which can be handled by a user and/or is intended for operational use by a person or company. The system 1406 or the chip-containing product 1416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in an apparatus comprising execution (processing) circuitry having one or more vector processing units for performing vector operations on vectors comprising multiple data elements. Execution circuitry having X vector processing units each configured to perform vector operations on Y bit wide vectors, with the respective vector processing units operable in parallel, may be said to have an $X \times Y$ bit vector datapath. In some embodiments, the execution circuitry is provided having six or more vector processing units. In some embodiments, the execution circuitry is provided having five or fewer vector processing units. In some embodiments, the execution circuitry is provided having two vector processing units (and no more). In some embodiments, the one or more vector processing units are configured to perform vector operations on 128-bit wide vectors. In some embodiments, the execution circuitry has a $2 \times 128$ bit vector datapath. Alternatively, in some embodiments the execution circuitry has a $6 \times 128$ bit vector datapath.

Concepts described herein may be embodied in an apparatus comprising a level one data (L1D) cache. The L1D cache is a private cache associated with a given processing element (e.g. a central processing unit (CPU) or graphics processing element (GPU)). In a cache hierarchy of multiple caches capable of caching data accessible by load/store operations processed by the given processing element, the L1D cache is a level of cache in the hierarchy which is faster to access than a level two (L2) cache. In some embodiments, the L1 data cache is the fastest to access is the hierarchy, although even faster to access caches, for example, level zero (L0) caches may also be provided. If a load/store operation hits in the L1D cache, it can be serviced with lower latency than if it misses in the L1D cache and is serviced based on data in a subsequent level of cache or in memory. In some embodiments, the L1D cache comprises storage capacity of less than 96 KB, in one example the L1D cache is a 64 KB cache. In some embodiments, the L1D cache comprises storage capacity of greater than or equal to 96 KB, in one example the L1D cache is a 128 KB cache.

Concepts described herein may be embodied in an apparatus comprising a level two (L2) cache. The L2 cache for a given processing element is a level of cache in the cache hierarchy that, among caches capable of holding data accessible to load/store operations, is next fastest to access after the L1D cache. The L2 cache can be looked up in response to a load/store operation missing in the L1D cache or an instruction fetch missing in an L1 instruction cache. In some embodiments, the L2 cache comprises storage capacity of less than 1536 KB (1.5 MB), in one example the L2 cache is a 1024 KB (1 MB) cache. In some embodiments, the L2 cache comprises storage capacity greater than or equal to 1536 KB and less than 2560 KB (2.5 MB), in one example the L2 cache is a 2048 KB (2 MB) cache. In some embodiments, the L2 cache comprises storage capacity greater than or equal to 2560 KB, in one example the L2 cache is a 3072 KB (3 MB) cache. In some embodiments, the L2 cache has a larger storage capacity than the L1D cache.

Figure 11:
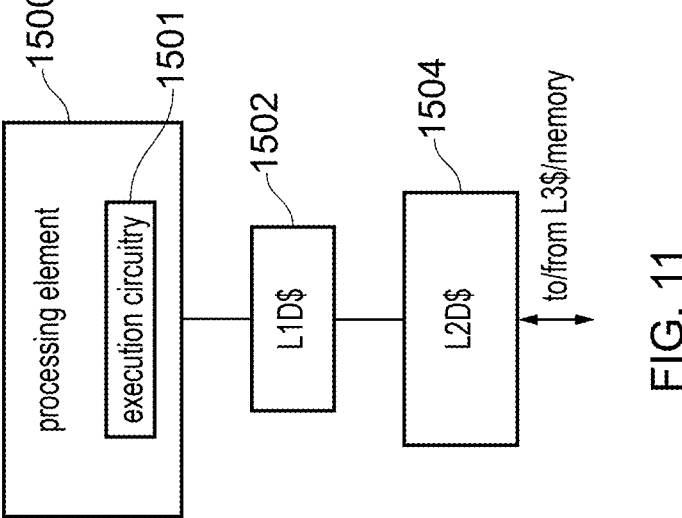
FIG. 11 schematically illustrates a processing element in accordance with some examples.

FIG. 11 illustrates an example of an apparatus comprising a processing element 1500 (e.g. a CPU or GPU) comprising execution (processing) circuitry 1501 for executing processing operations in response to decoded program instructions. The processing element 1500 has access to a L1D cache 1502 and a L2 cache 1504, which are part of a cache hierarchy of multiple caches for caching data from memory that is accessible by the processing element 1500 in response to load/store operations executed by the execution circuitry 1501. Thus the processing element 1500 may further comprises the components set out above in any of the described example apparatuses and the processing element 1500 is configured to determine a linear relationship between consumer values and producer data values as described herein.

Figure 12:
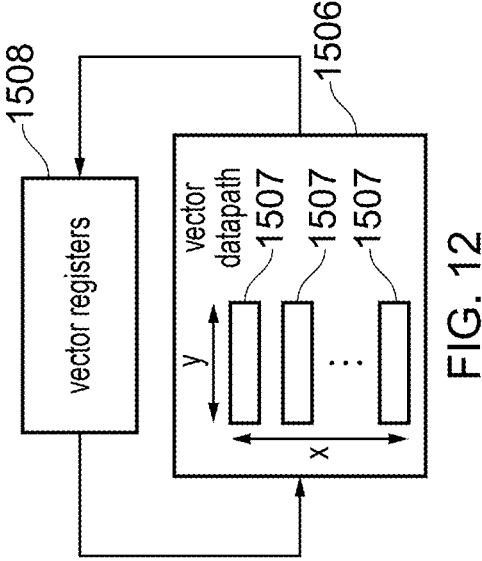
FIG. 12 schematically illustrates a vector datapath in accordance with some examples.

FIG. 12 illustrates an example of a vector datapath 1506 that may be provided as part of the execution circuitry 1501 of the processing element 1500, and vector registers 1508 for storing vector operands for processing by the vector datapath 1506. Vector operands read from the vector registers 1508 are processed by the vector datapath 1506 to generate vector results which may be written back to the vector registers 1508. The vector datapath 1506 is an X×Y bit vector datapath, comprising X vector processing units 1507 each configured to perform vector operations on Y bit vectors. The vector registers 1508 may be accessible as Z bit vector registers, where Z can be equal to Y or different to Y. For a vector operation requiring a Z-bit vector operand where Z is greater than Y, the Z-bit vector operand can be processed using two or more vector processing units 1507 operating in parallel on different portions of the Z-bit vector operand in the same cycle and/or using multiple passes through the vector datapath in two or more cycles. For vector operations requiring a Z-bit vector operand where Z is less than Y, a given vector processing unit 1507 can process two or more vectors in parallel.

Various example configurations are set out in the following numbered clauses:

Clause 1. Apparatus comprising:
  relationship storage circuitry to store a producer-consumer relationship, the producer-consumer relationship defining an association between a producer instruction and at least one consumer instruction, wherein a consumer value of the at least one consumer instruction is generated in dependence on producer data resulting from the producer instruction; and
  relationship determination circuitry to select a first producer-consumer pair and a second producer-consumer pair from a plurality of observed instructions, and to determine a linear relationship between consumer values and producer data values based on:
    respective consumer values of the first producer-consumer pair and the second producer-consumer pair and
    respective producer data values of the first producer-consumer pair and the second producer-consumer pair.

Clause 2. The apparatus of Clause 1, wherein the relationship determination circuitry is configured to determine the linear relationship between the consumer values and the producer data values by determining:
  a consumer value difference between the respective consumer values of the first producer-consumer pair and the second producer-consumer pair;
  a producer data difference between the respective producer data values of the first producer-consumer pair and the second producer-consumer pair;
  a slope value given by a ratio of the consumer value difference to the producer data difference;
  a scaled producer value given by a producer data value of one of: the first producer-consumer pair and the second producer-consumer pair, multiplied by the slope value; and
  an offset value given by a difference between a consumer value of: one of the first producer-consumer pair and the second producer-consumer pair, and the scaled producer value.

Clause 3. The apparatus of Clause 1 or Clause 2,
  wherein a representation of the linear relationship is stored in the relationship storage circuitry as the producer-consumer relationship.

Clause 4. The apparatus of Clause 2,
  wherein a representation of the linear relationship is stored in the relationship storage circuitry as the producer-consumer relationship, and
  wherein the slope value and the offset value are stored in the relationship storage circuitry as the representation of the linear relationship.

Clause 5. The apparatus of any of Clauses 1-4, wherein the relationship determination circuitry is configured to select the first producer-consumer pair from a first plurality of observed instructions in a first sampling period relating to the producer instruction and to select the second producer-consumer pair from a second plurality of observed instructions in a second sampling period relating to the producer instruction.

Clause 6. The apparatus of Clause 5, wherein the relationship storage circuitry is configured to store the first producer-consumer pair from the first sampling period in place of the producer-consumer relationship, and following the second sampling period and the determination of the linear relationship based on the first producer-consumer pair and the second producer-consumer pair from the second sampling period, to store the linear relationship as the producer-consumer relationship.

Clause 7. The apparatus of any of Clauses 1-6, further comprising:
  training circuitry to select a candidate producer from a plurality of observed instructions in a sampling period to evaluate a candidate producer-consumer relationship between the candidate producer instruction and subsequent candidate consumer instructions in the plurality of observed instructions and, when the candidate producer instruction and a subsequent candidate consumer instruction meet the linear relationship, to increase a confidence value associated with the candidate producer-consumer relationship.

Clause 8. The apparatus of Clause 7, wherein the training circuitry is configured to select the subsequent candidate consumer instructions in the plurality of observed instructions by using the linear relationship applied to the producer data resulting from the candidate producer instruction to predict consumer values of the subsequent candidate consumer instructions.

Clause 9. The apparatus of any of Clauses 1-8, wherein the producer instruction is a producer load and the at least one consumer instruction is at least one consumer load, wherein a load address of the at least one consumer load is generated in dependence on the producer data retrieved by the producer load.

Clause 10. The apparatus of Clause 9, further comprising:

a cache to store local copies of data items for use in data processing operations; and prefetch circuitry to initiate a prefetch of data for storage in the cache, wherein the prefetch circuitry is configured to initiate the prefetch for the at least one consumer load by using the linear relationship to predict the load address of the at least one consumer load.

Clause 11. The apparatus of Clause 10, wherein the prefetch circuitry is configured to use the at least one consumer load as a further producer load from which at least one further consumer load is generated in dependence on further producer data retrieved by the further producer load.

Clause 12. The apparatus of Clause 10 or Clause 11, wherein the prefetch circuitry is configured to perform strided prefetching.

Clause 13. The apparatus of Clause 2, or any of Clauses 3-12 when dependent on Clause 2, wherein the relationship determination circuitry is responsive to generation of a non-zero remainder when determining the ratio of the consumer value difference to the producer data difference to determine that the linear relationship represented by the slope value and the offset value is not valid.

Clause 14. The apparatus of any of Clauses 1-13, wherein the producer data comprises an array index.

Clause 15. The data processing apparatus of any of Clauses 1-13, wherein the producer data comprises a pointer indicative of the consumer value of the at least one consumer instruction.

Clause 16. The apparatus of Clause 7, or any of Clauses 8-15 when dependent on Clause 7, wherein the training circuitry is configured to select a candidate consumer instruction in dependence on a difference limit between the producer data and the consumer value, and an indication of the producer instruction and the candidate consumer instruction is selectively stored in the relationship storage circuitry in place of the producer-consumer relationship.

Clause 17. The apparatus of any of Clauses 1-16, wherein the processing circuitry comprises a 6×128 bit vector datapath.

Clause 18. A system comprising:

the apparatus of any of Clauses 1-17, implemented in at least one packaged chip;

at least one system component; and

a board, wherein the at least one packaged chip and the at least one system component are assembled on the board.

Clause 19. A chip-containing product comprising the system of Clause 18 assembled on a further board with at least one other product component.

Clause 20. A method of data processing comprising:

storing a producer-consumer relationship, the producer-consumer relationship defining an association between a producer instruction and at least one consumer instruction, wherein a consumer value of the at least one consumer instruction is generated in dependence on producer data resulting from the producer instruction;

selecting a first producer-consumer pair and a second producer-consumer pair from a plurality of observed instructions; and determining a linear relationship between consumer values and producer data values based on:

respective consumer values of the first producer-consumer pair and the second producer-consumer pair and respective producer data values of the first producer-consumer pair and the second producer-consumer pair.

Clause 21. A non-transitory computer-readable medium to store computer-readable code for fabrication of an apparatus comprising:

relationship storage circuitry to store a producer-consumer relationship, the producer-consumer relationship defining an association between a producer instruction and at least one consumer instruction, wherein a consumer value of the at least one consumer instruction is generated in dependence on producer data resulting from the producer instruction; and relationship determination circuitry to select a first producer-consumer pair and a second producer-consumer pair from a plurality of observed instructions, and to determine a linear relationship between consumer value and producer data values based on:

respective consumer values of the first producer-consumer pair and the second producer-consumer pair and respective producer data values of the first producer-consumer pair and the second producer-consumer pair.

In brief overall summary a producer-consumer relationship is stored, the producer-consumer relationship defining an association between a producer instruction and at least one consumer instruction, wherein a consumer value of the at least one consumer instruction is generated in dependence on producer data resulting from the producer instruction. A first producer-consumer pair and a second producer-consumer pair are selected from a plurality of observed instructions and a linear relationship between consumer values and producer data values is determined based on: respective consumer values of the first producer-consumer pair and the second producer-consumer pair and respective producer data values of the first producer-consumer pair and the second producer-consumer pair.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. Apparatus comprising:
relationship storage circuitry configured to store a producer-consumer relationship, the producer-consumer relationship defining an association between a producer instruction and at least one consumer instruction, wherein a consumer value of the at least one consumer instruction is generated in dependence on producer data resulting from the producer instruction;
relationship determination circuitry configured to select a first producer-consumer pair and a second producer-consumer pair from a plurality of observed instructions, and to determine a linear relationship between consumer values and producer data values based on:
respective consumer values of the first producer-consumer pair and the second producer-consumer pair, and
respective producer data values of the first producer-consumer pair and the second producer-consumer pair; and
prediction circuitry configured to determine a predicted consumer value based on the linear relationship and to initiate a speculative action based on the predicted consumer value.

2. The apparatus of claim 1, wherein the relationship determination circuitry is configured to determine the linear relationship between the consumer values and the producer data values by determining:
a consumer value difference between the respective consumer values of the first producer-consumer pair and the second producer-consumer pair;
a producer data difference between the respective producer data values of the first producer-consumer pair and the second producer-consumer pair;
a slope value given by a ratio of the consumer value difference to the producer data difference;
a scaled producer value given by a producer data value of one of: the first producer-consumer pair and the second producer-consumer pair, multiplied by the slope value; and
an offset value given by a difference between a consumer value of: one of the first producer-consumer pair and the second producer-consumer pair, and the scaled producer value.

3. The apparatus of claim 2, wherein a representation of the linear relationship is stored in the relationship storage circuitry as the producer-consumer relationship, and
wherein the slope value and the offset value are stored in the relationship storage circuitry as the representation of the linear relationship.

4. The apparatus of claim 2, wherein the relationship determination circuitry is responsive to generation of a non-zero remainder when determining the ratio of the consumer value difference to the producer data difference to determine that the linear relationship represented by the slope value and the offset value is not valid.

5. The apparatus of claim 1, wherein a representation of the linear relationship is stored in the relationship storage circuitry as the producer-consumer relationship.

6. The apparatus of claim 1, wherein the relationship determination circuitry is configured to select the first producer-consumer pair from a first plurality of observed instructions in a first sampling period relating to the producer instruction and to select the second producer-consumer pair from a second plurality of observed instructions in a second sampling period relating to the producer instruction.

7. The apparatus of claim 6, wherein the relationship storage circuitry is configured to store the first producer-consumer pair from the first sampling period in place of the producer-consumer relationship, and
following the second sampling period and the determination of the linear relationship based on the first producer-consumer pair and the second producer-consumer pair from the second sampling period, to store the linear relationship as the producer-consumer relationship.

8. The apparatus of claim 1, further comprising:
training circuitry configured to select a candidate producer instruction from a plurality of observed instructions in a sampling period to evaluate a candidate producer-consumer relationship between the candidate producer instruction and subsequent candidate consumer instructions in the plurality of observed instructions and, when the candidate producer instruction and a subsequent candidate consumer instruction meet the linear relationship, to increase a confidence value associated with the candidate producer-consumer relationship.

9. The apparatus of claim 8, wherein the training circuitry is configured to select the subsequent candidate consumer instructions in the plurality of observed instructions by using the linear relationship applied to the producer data resulting from the candidate producer instruction to predict consumer values of the subsequent candidate consumer instructions.

10. The apparatus of claim 8, wherein the training circuitry is configured to select a candidate consumer instruction in dependence on a difference limit between the producer data and the consumer value,
and an indication of the producer instruction and the candidate consumer instruction is selectively stored in the relationship storage circuitry in place of the producer-consumer relationship.

11. The apparatus of claim 1, wherein the producer instruction is a producer load and the at least one consumer instruction is at least one consumer load, and wherein a load address of the at least one consumer load is generated in dependence on the producer data retrieved by the producer load.

12. The apparatus of claim 11, wherein the prediction circuitry comprises prefetch circuitry configured to initiate a prefetch of data for storage in a cache;
wherein the prefetch circuitry is configured to initiate the prefetch for the at least one consumer load by using the linear relationship to predict the load address of the at least one consumer load.

13. The apparatus of claim 12, wherein the prefetch circuitry is configured to use the at least one consumer load as a further producer load from which at least one further consumer load is generated in dependence on further producer data retrieved by the further producer load.

14. The apparatus of claim 1, wherein the producer data comprises an array index.

15. The apparatus of claim 1, wherein the producer data comprises a pointer indicative of the consumer value of the at least one consumer instruction.

16. A chip-containing product comprising the system of claim 15 assembled on a further board with at least one other product component.

17. The apparatus of claim 1, comprising processing circuitry comprising a 6×128 bit vector datapath.

18. A system comprising:

the apparatus of claim 1, implemented in at least one packaged chip;

at least one system component; and a board, wherein the at least one packaged chip and the at least one system component are assembled on the board.

19. A method of data processing comprising:

storing a producer-consumer relationship in relationship storage circuitry, the producer-consumer relationship defining an association between a producer instruction and at least one consumer instruction, wherein a consumer value of the at least one consumer instruction is generated in dependence on producer data resulting from the producer instruction;

selecting, using relationship determination circuitry, a first producer-consumer pair and a second producer-consumer pair from a plurality of observed instructions; and determining, using the relationship determination circuitry, a linear relationship between consumer values and producer data values based on:

respective consumer values of the first producer-consumer pair and the second producer-consumer pair, and respective producer data values of the first producer-consumer pair and the second producer-consumer pair;

determining a predicted consumer value for a given consumer instruction based on the linear relationship; and initiating a speculative action for the given consumer instruction based on the predicted consumer value.

20. A non-transitory computer-readable medium to store computer-readable code for fabrication of an apparatus comprising:

relationship storage circuitry to store a producer-consumer relationship, the producer-consumer relationship defining an association between a producer instruction and at least one consumer instruction, wherein a consumer value of the at least one consumer instruction is generated in dependence on producer data resulting from the producer instruction; and relationship determination circuitry to select a first producer-consumer pair and a second producer-consumer pair from a plurality of observed instructions, and to determine a linear relationship between consumer value and producer data values based on:

respective consumer values of the first producer-consumer pair and the second producer-consumer pair, and respective producer data values of the first producer-consumer pair and the second producer-consumer pair; and prediction circuitry configured to determine a predicted consumer value based on the linear relationship and to initiate a speculative action based on the predicted consumer value.

\* \* \* \* \*